US010168232B2

(12) United States Patent
Nakamura et al.

(10) Patent No.: US 10,168,232 B2
(45) Date of Patent: Jan. 1, 2019

(54) NON-CONTACT TEMPERATURE SENSOR

(71) Applicant: MITSUBISHI MATERIALS CORPORATION, Tokyo (JP)

(72) Inventors: Kenzo Nakamura, Naka (JP); Masashi Nishiyama, Naka (JP); Fumio Matsumoto, Naka (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 168 days.

(21) Appl. No.: 15/120,835

(22) PCT Filed: Feb. 10, 2015

(86) PCT No.: PCT/JP2015/000598
§ 371 (c)(1),
(2) Date: Aug. 23, 2016

(87) PCT Pub. No.: WO2015/129176
PCT Pub. Date: Sep. 3, 2015

(65) Prior Publication Data
US 2016/0363485 A1 Dec. 15, 2016

(30) Foreign Application Priority Data

Feb. 26, 2014 (JP) .................................. 2014-035330

(51) Int. Cl.
G01K 7/22 (2006.01)
G01J 5/20 (2006.01)
(Continued)

(52) U.S. Cl.
CPC .............. G01K 7/223 (2013.01); G01J 5/024 (2013.01); G01J 5/20 (2013.01); G03G 15/2039 (2013.01)

(58) Field of Classification Search
CPC .. G01K 7/223; G01J 5/024; G01J 5/20; G01J 2005/206; G01J 5/40; G03G 15/2039
See application file for complete search history.

(56) References Cited

U.S. PATENT DOCUMENTS 4,928,513 A * 5/1990 Sugihara ................ G01N 27/12
338/34
4,968,964 A * 11/1990 Nagai .................. H01C 1/1406
338/22 R
(Continued)

FOREIGN PATENT DOCUMENTS

JP 05-069643 U 9/1993
JP 07-286911 A 10/1995
(Continued)

OTHER PUBLICATIONS

Supplementary European Search Report dated Oct. 9, 2017, issued for the European patent application No. 15754934.6.
(Continued)

Primary Examiner — Lisa Caputo
Assistant Examiner — Philip Cotey
(74) Attorney, Agent, or Firm — Locke Lord LLP

(57) ABSTRACT

A non-contact temperature sensor is provided, the sensor including: an insulating film, a thin film thermistor portion formed on a front-surface of the insulating film, a pair of comb shaped electrodes formed on the thin film thermistor portion, a pair of pad electrodes formed on the front-surface of the insulating film, a pair of pattern wiring portions, and a pair of lead frames that is adhered to the pair of pad electrodes on the front-surface side of the insulating film, wherein the thin film thermistor portion is formed in a thermistor forming region arranged on the front-end side of the insulating film, the pad electrodes are formed in an electrode forming region arranged on the base-end side of the insulating film, the front-end side of the pair of lead (Continued)

frames is arranged to surround the circumference of the thermistor forming region in a non-contact manner.

5 Claims, 5 Drawing Sheets

(51) Int. Cl.
    *G01J 5/02*     (2006.01)
    *G03G 15/20*    (2006.01)

(56) References Cited

U.S. PATENT DOCUMENTS

| | | | | |
|---|---|---|---|---|
| 5,216,404 | A | * | 6/1993 | Nagai ............... H01C 1/1413 |
| | | | | 204/192.21 |
| 5,914,488 | A | * | 6/1999 | Sone .................. G01J 5/04 |
| | | | | 250/332 |
| 5,962,854 | A | | 10/1999 | Endo |
| 6,172,592 | B1 | * | 1/2001 | Inoue .................. H01C 1/14 |
| | | | | 338/22 R |
| 6,448,557 | B2 | * | 9/2002 | Oda .................... G01J 5/02 |
| | | | | 250/330 |
| 6,565,254 | B2 | * | 5/2003 | Sato ................... G01J 5/02 |
| | | | | 136/224 |
| 2008/0056330 | A1 | | 3/2008 | Otsuka |

FOREIGN PATENT DOCUMENTS

| | | |
|---|---|---|
| JP | H08-110268 A | 4/1996 |
| JP | 08-148727 A | 6/1996 |
| JP | 2005-214641 A | 8/2005 |
| JP | 2008-058370 A | 3/2008 |
| JP | 2013-210303 A | 10/2013 |

OTHER PUBLICATIONS

International Search Report dated Mar. 31, 2015, issued for PCT/JP2015/000598.

* cited by examiner

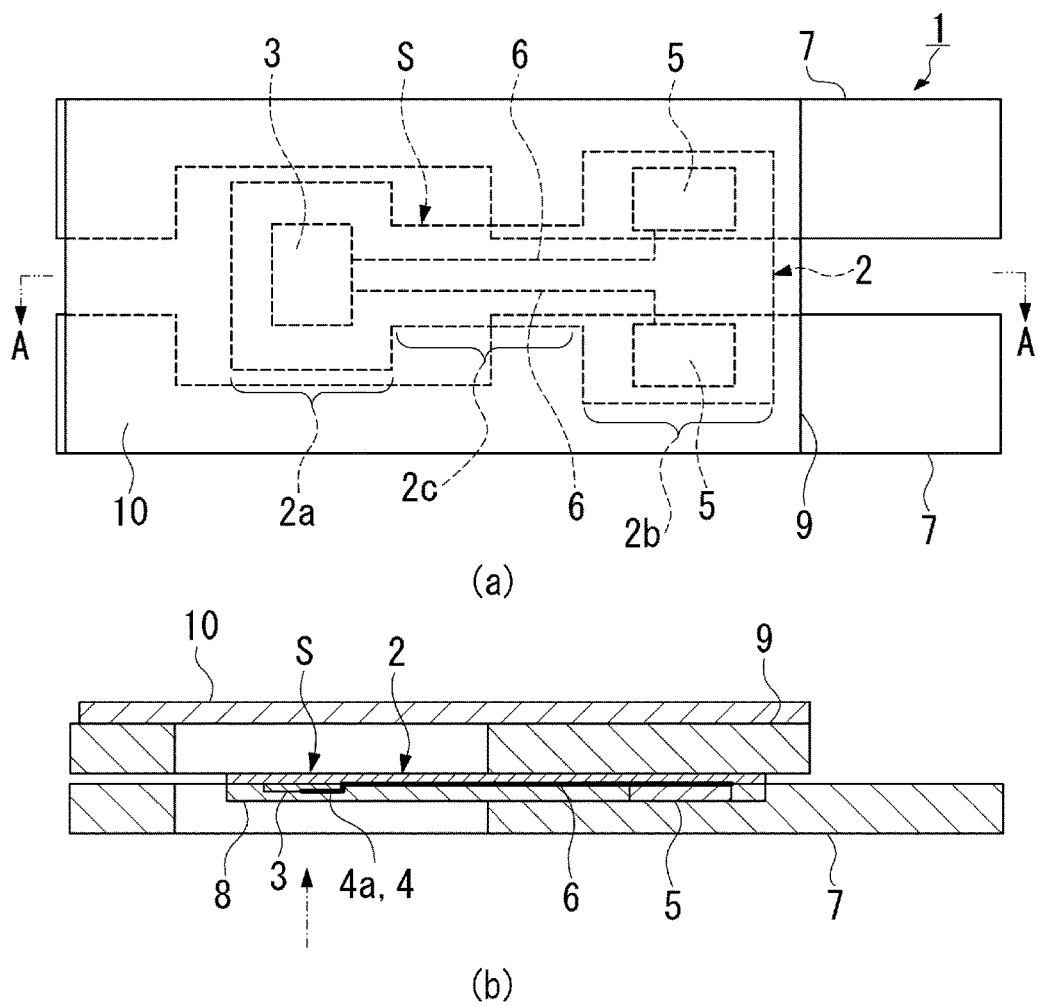
[FIG.1]

[FIG.2]
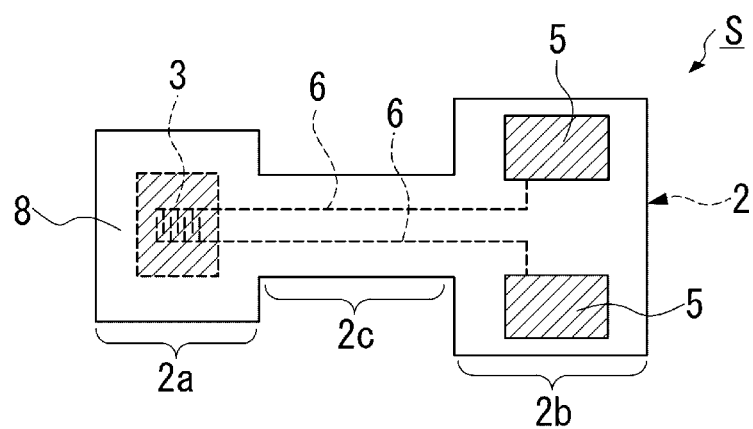

[FIG.3]
(a) 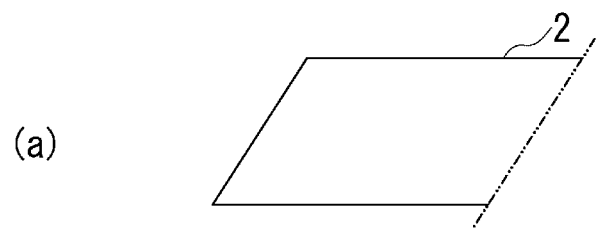
(b) 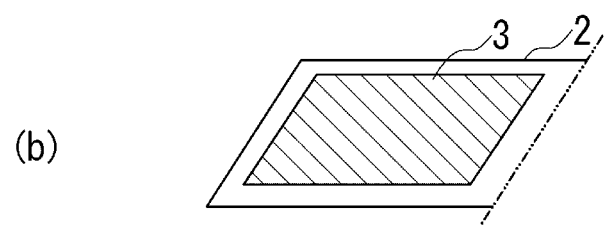
(c) 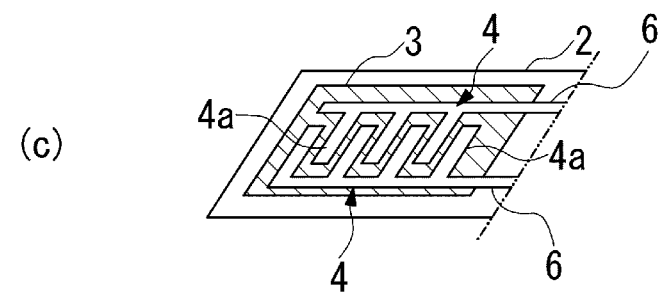
(d) 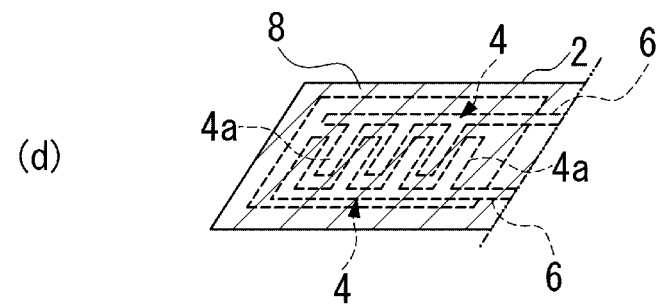

[FIG.4]
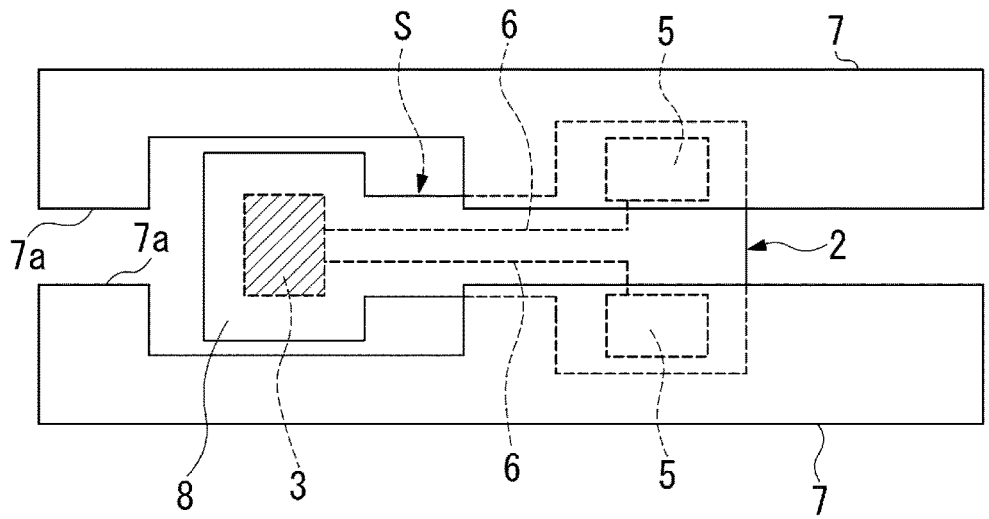
[FIG.5]
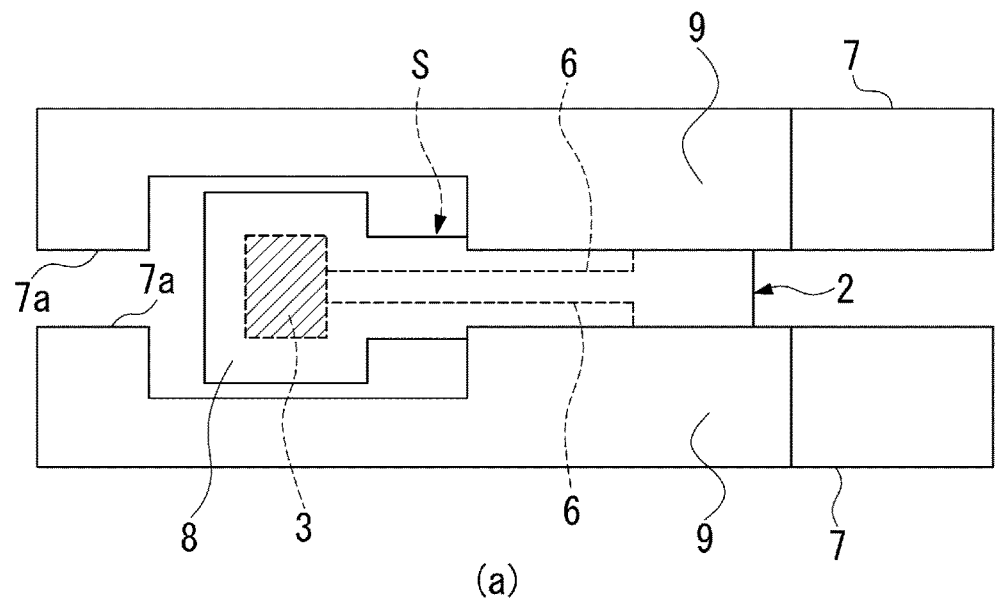
(a)
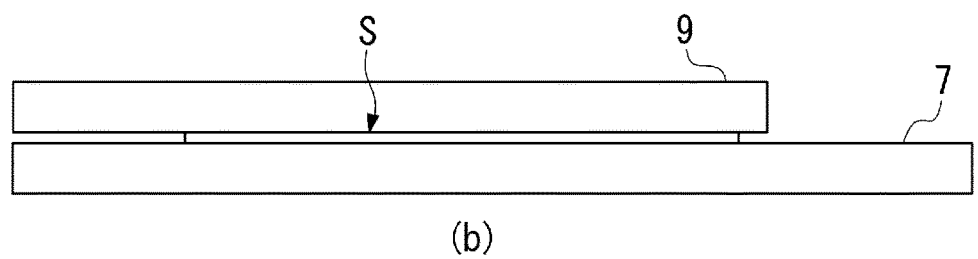
(b)

[FIG.6]
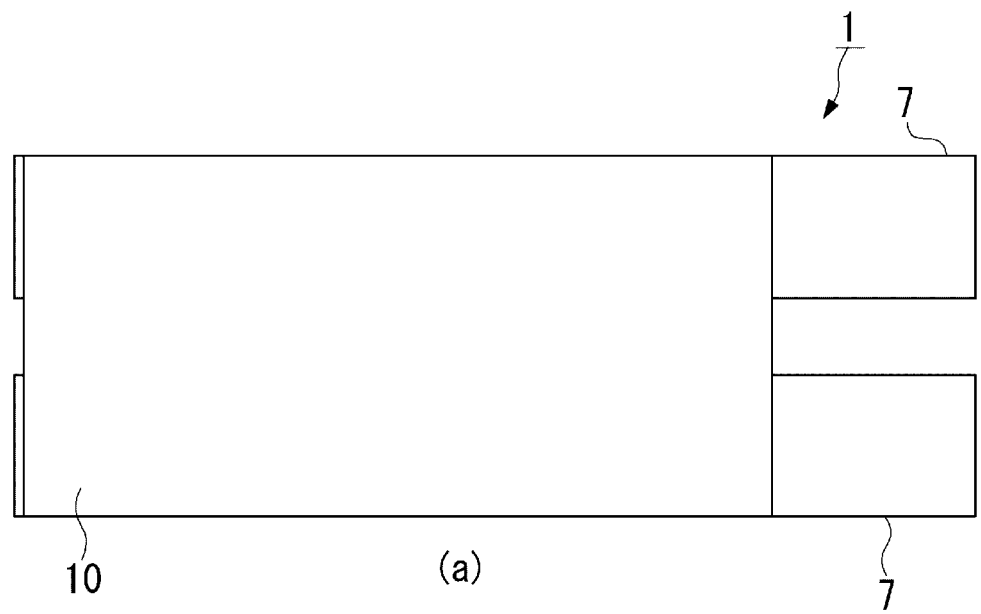
(a)
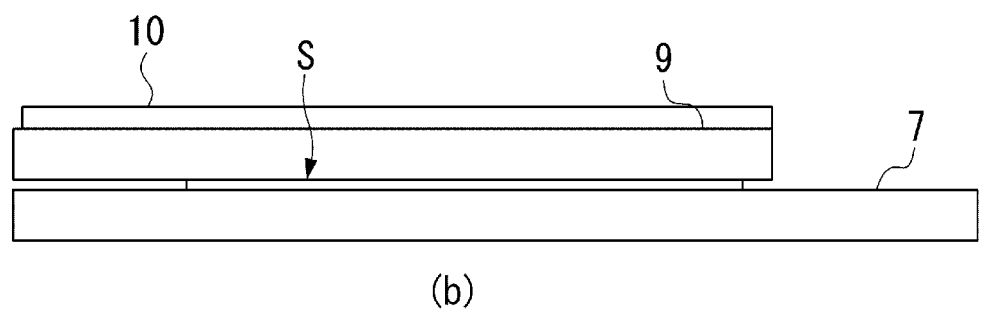
(b)

NON-CONTACT TEMPERATURE SENSOR

BACKGROUND OF THE INVENTION

Field of the Invention

The present invention relates to a non-contact temperature sensor that is suitable for measuring a temperature of a heat roller used in a copying machine, a printer, or the like.

Description of the Related Art

In general, a temperature sensor may be placed in a non-contact state with a heat roller (fuser roller) in a copying machine or a printer in order to measure the temperature of the roller. Such a non-contact temperature sensor is disclosed in, for example, Patent document 1, that includes a flexible printed circuit board, in which a conductor pattern is formed on the surface of a resin film and on this conductor pattern a temperature-sensitive element is mounted, and a casing to which this flexible printed circuit board is fixed at its peripheral edge.

Patent document 2 discloses a non-contact temperature sensor in which a glass-sealed thermistor element is fixed to the back surface of an infrared transparent film. In this non-contact temperature sensor, the end or peripheral edge of the infrared transparent film is fixed to the base having a fixing flange. The thermistor element is also electrically connected through a lead wire.

PRIOR ART DOCUMENTS

Patent Documents

[Patent Document 1] Japanese Unexamined Patent Application Publication No. 2010-43930
[Patent Document 2] Japanese Unexamined Patent Application Publication No. 2004-205417

SUMMARY OF THE INVENTION

Problems to be Solved by the Invention

The following problems still remain in the conventional technologies described above.

Specifically, in the conventional technologies, since the flexible printed circuit board or the film, on which a temperature-sensitive element is mounted, is fixed to the casing or the base at its peripheral edge or end, the heat caused by infrared radiation can escape through the film to the surrounding casing or base, and this may cause the temperature detection precision to deteriorate. In addition, since the temperature-sensitive element has a large heat capacity and the wiring makes the heat conductance high, the responsivity may be decreased.

Furthermore, since the flexible printed circuit board or the film is fixed to the casing or the base at its peripheral edge or end, the casing or the base can be bent, broken, or the like when a paper gets jammed between the roller and the sensor while measuring the temperature of the heat roller in a copying machine or the like. This may disadvantageously change the distance between the roller and the sensor even after the jammed paper is removed, that is, their original positions cannot be restored. In order to prevent such a problem as a machine failure, the sensor is conventionally arranged separated from the roller by a distance at which such trouble will not occur, but this may cause the detection precision to deteriorate.

The present invention has been made in view of the aforementioned circumstances, and an object of the present invention is to provide a non-contact temperature sensor which has a high precision and an excellent responsivity by suppressing the escape of heat, and can restore its original position even when a paper jam occurs.

Means for Solving the Problems

The present invention adopts the following configuration in order to overcome the aforementioned problems. Specifically, a non-contact temperature sensor according to a first aspect of the present invention comprises: an insulating film; a thin film thermistor portion made of a thermistor material that is patterned on a front-surface of the insulating film; a pair of comb shaped electrodes that is patterned so as to be opposed to each other and to have a plurality of comb portions at least either on the upper or lower surface of the thin film thermistor portion; a pair of pad electrodes that is patterned on the front-surface of the insulating film; a pair of pattern wiring portions that is patterned on the front-surface of the insulating film with one end thereof being connected to the pair of comb shaped electrodes and the other end thereof being connected to the pair of pad electrodes; and a pair of lead frames that is adhered to the pair of pad electrodes on the front-surface side of the insulating film, wherein the thin film thermistor portion is formed in a thermistor forming region arranged on the front-end side of the insulating film, the pad electrodes are formed in an electrode forming region arranged on the base-end side of the insulating film, and the front-end side of the pair of lead frames is arranged so as to surround the circumference of the thermistor forming region in a non-contact manner.

Since the front-end side of the pair of lead frames is arranged so as to surround the circumference of thermistor forming region in a non-contact manner in this non-contact temperature sensor, the thin film thermistor portion is mechanically protected by the surrounding lead frames, and since it is in a non-contact state with respect to the surrounding lead frames, heat does not easily escape to the lead frames, thereby resulting in a high responsivity and detection precision. In addition, since radiant heat is received by the thin film thermistor portion that has a small heat capacity compared with a chip-type thermistor element or the like, a high responsivity can be obtained. Furthermore, since the thermistor forming region protrudes in the air in a non-contact manner and does not extend to the lead frames, it can be set up in a small area, leading to reduction in size of the sensor. Furthermore, even if a jammed paper changes the distance between the roller and the sensor in the case of measuring the temperature of the roller in a copying machine or the like, the sensor can be restored to its original position due to the spring property (elasticity) of the lead frames after removal of the paper.

A non-contact temperature sensor according to a second aspect of the present invention is characterized in that the non-contact temperature sensor according to the first aspect comprises a pair of back-surface-side frames arranged with the base-end side thereof being adhered to a back-surface side of the electrode forming region on the insulating film, and the front-end side thereof being arranged so as to surround the circumference of the thermistor forming region in a non-contact manner.

Specifically, since this non-contact temperature sensor comprises the pair of back-surface-side frames arranged with the base-end side thereof being adhered to the back-surface side of the electrode forming region on the insulating film and the front-end side thereof being arranged so as to surround the circumference of the thermistor forming region in a non-contact manner, the thermistor forming region is mechanically protected not only by the front-surface-side lead frames but also by the back-surface-side frames, and thus reinforced with a higher rigidity. In addition, since the electrode forming region can be supported between the lead frames and the back-surface-side frames, the joint strength between the lead frames and the pad electrodes can be maintained, thereby improving the reliability.

A non-contact temperature sensor according to a third aspect of the present invention is characterized in that the non-contact temperature sensor according to the first or second aspect comprises an insulating protection film arranged so as to cover a back-surface side of the thermistor forming region in a non-contact manner.

Specifically, since this non-contact temperature sensor comprises the insulating protection film arranged so as to cover the back-surface side of the thermistor forming region in a non-contact manner, the protection film can shield radiant heat on the back-surface side, and thus, except from an object to be measured, the influence of outside air or the like and the heat interference can be suppressed.

A non-contact temperature sensor according to a fourth aspect of the present invention is characterized by the non-contact temperature sensor according to any one of the first to third aspects, wherein the pattern wiring portions are made of a thin film having a film thickness of 100 to 300 nm.

Specifically, since the pattern wiring portions are made of a thin film having a film thickness of 100 to 300 nm in this non-contact temperature sensor, the film can be thinner at nano-level compared with a metal foil having a thickness of about 100 μm that is used for wiring in a common printed circuit board or the like. As a result, heat conductance can be significantly reduced, and further, a high responsivity can be obtained. Note that when the film thickness is less than 100 nm, a wire may be broken as the insulating film is bent; when the film thickness is more than 300 nm, the heat conductance can be increased as in the wiring of a conventional metal foil. Therefore, the film preferably has a range of thickness as described above.

A non-contact temperature sensor according to a fifth aspect of the present invention is characterized by the non-contact temperature sensor according to any one of the first to fourth aspects, wherein the insulating film has a wiring forming region, in which the pattern wiring portions are arranged, between the thermistor forming region and the electrode forming region, and the wiring forming region is formed with a narrower width than those of the thermistor forming region and the electrode forming region.

Specifically, since the wiring forming region is formed with a narrower width than those of the thermistor forming region and the electrode forming region in this non-contact temperature sensor, heat does not easily escape through the wiring forming region, thereby resulting in a higher responsivity.

Effects of the Invention

According to the present invention, the following effects may be provided.

Specifically, since the front-end side of the pair of lead frames is arranged so as to surround the circumference of the thermistor forming region in a non-contact manner in the non-contact temperature sensor of the present invention, the thin film thermistor portion is mechanically protected by the surrounding lead frames and heat does not easily escape to the lead frames, thereby resulting in a high responsivity and a high detection precision. Furthermore, since the heat capacity is small, a high responsivity can be obtained. In addition, even if a jammed paper changes the distance between the roller and the sensor in the case of measuring the temperature of the roller in a copying machine or the like, the sensor can be restored to its original position due to the spring property of the lead frames. Accordingly, the sensor can be placed closer to the roller than where the roller is conventionally placed, and thus, a high detection precision can be obtained.

Thus, since the non-contact temperature sensor of the present invention, in which the thin film thermistor portion is protected, allows the accurate measurement of a temperature with a high responsivity in a non-contact manner, it is suitable for measuring the temperature of the heat roller in a copying machine, printer, or the like.

BRIEF DESCRIPTION OF THE DRAWINGS

FIG. 1 shows a plan view (a) and a cross-sectional view (b) along line A-A perspectively illustrating the inside of a non-contact temperature sensor according to one embodiment of the present invention.

FIG. 2 is a plan view illustrating a sensor portion according to the present embodiment.

FIG. 3 is a perspective view of the essential parts for illustrating a method for the producing of a sensor portion in the order of the steps according to the present embodiment.

FIG. 4 is a plan view illustrating a step of attaching lead frames according to the present embodiment.

FIG. 5 shows a plan view and a front view illustrating a step of attaching back-surface-side frames according to the present embodiment.

FIG. 6 shows a plan view and a front view illustrating a step for attaching a protection film according to the present embodiment.

DESCRIPTION OF THE EMBODIMENTS

Hereinafter, a non-contact temperature sensor according to one embodiment of the present invention will be described with reference to FIGS. 1 to 6. In the drawings used in the following description, the scale of each component is changed as appropriate so that each component is recognizable or is readily recognized.

As shown in FIGS. 1 to 3, a non-contact temperature sensor 1 according to the present embodiment includes an insulating film 2, a thin film thermistor portion 3 made of a thermistor material that is patterned on the front-surface of the insulating film 2, a pair of comb shaped electrodes 4 that is patterned on the thin film thermistor portion 3 so as to be opposed to each other and to have a plurality of comb portions 4a, a pair of pad electrodes 5 that is patterned on the front-surface of the insulating film 2, a pair of pattern wiring portions 6 that is patterned on the front-surface of the insulating film 2 with one end thereof being connected to the pair of comb shaped electrodes 4 and the other end thereof being connected to the pair of pad electrodes 5, and a pair of lead frames 7 adhered to the pair of pad electrodes 5 on the front-surface side of the insulating film 2.

As shown in FIGS. 2 and 3, a sensor portion "S" is constituted by the insulating film 2, the thin film thermistor portion 3, the comb shaped electrodes 4, the pad electrodes 5, and the pattern wiring portions 6.

The sensor portion "S" includes a protection film 8 formed on the front-surface of the insulating film 2 except the area where the pad electrodes 5 are arranged.

The thin film thermistor portion 3 is formed in a thermistor forming region 2a arranged on the front-end side of the insulating film 2. The pad electrodes 5 are formed in an electrode forming region 2b arranged on the base-end side of the insulating film 2. The insulating film 2 further has a wiring forming region 2c, in which the pattern wiring portions 6 are arranged, between the thermistor forming region 2a and the electrode forming region 2b. The wiring forming region 2c is formed with a narrower width than those of the thermistor forming region 2a and the electrode forming region 2b.

The front-end side of the pair of lead frames 7 is arranged so as to surround the circumference of the thermistor forming region 2a in a non-contact manner. Specifically, the front-end side of the pair of lead frames 7 has front ends 7a that extend on both lateral sides of the thermistor forming region 2a, and further, bend toward each other in an opposed direction so as to surround the lateral and front sides of the thermistor forming region 2a. These front ends 7a are opposed in close proximity to each other. The base-end side of the pair of lead frames 7 is formed with a wider width than the portions extending on the lateral sides of the thermistor forming region 2a, and is adhered to the pair of the pad electrodes 5 in the electrode forming region 2b by welding.

Therefore, the pair of lead frames 7 extends parallel to each other, and only the portions extending on the lateral sides of the thermistor forming region 2a are formed with a narrower width and are arranged so as to surround the thermistor forming region 2a. Thus, the thermistor forming region 2a protrudes into an area surrounded by the front-end sides of the pair of lead frames 7 in a non-contact manner so as to be floating in the air.

Note that the lead frames 7 may be adhered to the pad electrodes 5 by soldering.

The non-contact temperature sensor 1 according to the present embodiment also includes a pair of back-surface-side frames 9 arranged with the base-end side thereof being adhered to the back-surface side of the electrode forming region 2b on the insulating film 2 and the front-end side thereof covering the circumference of the thermistor forming region 2a in a non-contact manner, and an insulating protection film 10 arranged so as to cover the back-surface side of the thermistor forming region 2a in a non-contact manner. Therefore, in the non-contact temperature sensor 1, only the front-surface side of the insulating film 2 is open and can receive radiant heat (shown by the "one-dotted and dashed" arrow in FIG. 1) from an object to be measured, as shown in FIG. 1(b).

Note that the back-surface-side frames 9 are preferably made of the same metal material as that of the lead frames 7 in order to avoid deformation due to the differences between the coefficients of thermal expansion. Also, the lead frames 7 and the back-surface-side frames 9 are preferably made of a material having an elasticity to some extent in order to maintain their positions parallel to an object to be measured and to be restored to their original positions when the sensor is bent.

The pattern wiring portions 6 are made of a thin film having a film thickness of 100 to 300 nm.

The insulating film 2 is made of, for example, a polyimide resin sheet. Although the insulating film 2 may be made of other materials such as polyethylene terephthalate (PET), polyethylene naphthalate (PEN), and the like, a polyimide film is more preferable for measuring the temperature of the heat roller because its maximum allowable working temperature is as high as 230° C.

The thin film thermistor portion 3 is arranged on the front-end side of the insulating film 2, and made of a Ti—Al—N thermistor material. In particular, the thin film thermistor portion 3 consists of a metal nitride represented by the general formula: $Ti_xAl_yN_z$ (where $0.70 \leq y/(x+y) \leq 0.98$, $0.4 \leq z \leq 0.5$, and $x+y+z=1$), wherein the crystal structure thereof is a hexagonal wurtzite-type single phase.

The pattern wiring portions 6 and the comb shaped electrodes 4 have a Cr or Ni—Cr bonding layer having a film thickness of 5 to 100 nm formed on the thin film thermistor portion 3, and an electrode layer made of a noble metal such as Au having a film thickness of 50 to 295 nm formed on the bonding layer.

The pair of comb shaped electrodes 4 is patterned into a comb shape so as to be opposed to each other and to have the comb portions 4a that are alternately arranged.

The protection film 8 is made of an electrical insulation resin film or the like, and a polyimide film having a thickness of 20 μm may be employed, for example.

The protection film 10 is made of an electrical insulation resin film or the like, and a polyimide film may be employed, for example.

As described above, the thin film thermistor portion 3 is made of a metal nitride material, and consists of a metal nitride represented by the general formula: $Ti_xAl_yN_z$ (where $0.70 \leq y/(x+y) \leq 0.98$, $0.4 \leq z \leq 0.5$, and $x+y+z=1$), wherein the crystal structure thereof is a hexagonal crystal system and a wurtzite-type (space group: $P6_3mc$ (No. 186)) single phase.

Also, the thin film thermistor portion 3 is deposited as a film having a film thickness of 100 to 1000 nm for example, and is a columnar crystal extending in a vertical direction with respect to the surface of the film. Furthermore, it is preferable that the material of the thin film thermistor portion 3 is more strongly oriented along the c-axis than the a-axis in a vertical direction with respect to the surface of the film.

Note that the decision about whether the material of the thin film thermistor portion 3 has a strong a-axis orientation (100) or a strong c-axis orientation (002) in a vertical direction with respect to the surface of the film (film thickness direction) is made by examining the orientation of the crystal axis using X-ray diffraction (XRD). When the peak intensity ratio of (100)/(002), where (100) is the Miller index indicating a-axis orientation and (002) is the Miller index indicating c-axis orientation, is less than 1, the material of the thin film thermistor portion 3 is determined to have a strong c-axis orientation.

Next, a method for producing the non-contact temperature sensor 1 will be described below with reference to FIGS. 2 to 5.

A method for producing the non-contact temperature sensor 1 according to the present embodiment includes a step of forming a thin film thermistor portion for patterning the thin film thermistor portion 3 on the insulating film 2, a step of forming electrodes for patterning the pair of pattern wiring portions 6 on the insulating film 2 with the pair of comb shaped electrodes 4 being arranged on the thin film thermistor portion 3 so as to be opposed to each other, a step of forming a protection film for forming the protection film 8 on the front-surface of the insulating film 2, a step of welding lead frames for welding the lead frames 7 to the pad electrodes 5, a step of adhering back-surface-side frames for adhering the back-surface-side frames 9 to the insulating film 2, and a step of adhering a protection film for adhering the protection film 10 to the back-surface-side frames 9.

In a more specific example of the method for producing the non-contact temperature sensor 1, a thermistor film made of a material consisting of $Ti_xAl_yN_z$ (where x=9, y=43, and z=48) having a film thickness of 200 nm is deposited on the insulating film 2 made of a polyimide film having a thickness of 50 μm shown in FIG. 3(a) by a reactive sputtering method in a nitrogen-containing atmosphere using a Ti—Al alloy sputtering target. The sputtering conditions at this time are as follows: an ultimate vacuum: $5\times10^{-6}$ Pa; a sputtering gas pressure: 0.4 Pa; a target input power (output): 200 W; and a percentage of nitrogen gas in a mixed gas (Ar gas+nitrogen gas) atmosphere: 20%.

Next, patterning is performed as follows: after a resist solution has been coated on the deposited thermistor film using a bar coater, pre-baking is performed for 1.5 minutes at a temperature of 110° C.; after exposure by an exposure device, any unnecessary portions are removed by a developing solution, and then post-baking is performed for 5 minutes at a temperature of 150° C. Then, any unnecessary portion of the $Ti_xAl_yN_z$ thermistor film is subject to wet etching using a commercially available Ti etchant, and then the resist is stripped so as to form the thin film thermistor portion 3 as desired, as shown in FIG. 3(b).

Next, a bonding layer made of a Cr film having a film thickness of 20 nm is formed on the thin film thermistor portion 3 and the insulating film 2 by a sputtering method. Furthermore, an electrode layer of an Au film having a film thickness of 100 nm is formed on this bonding layer by a sputtering method.

Next, patterning is performed as follows: after a resist solution has been coated on the deposited electrode layer using a bar coater, pre-baking is performed for 1.5 minutes at a temperature of 110° C.; after exposure by an exposure device, any unnecessary portion is removed by a developing solution, and then post-baking is performed for 5 minutes at a temperature of 150° C. Then, any unnecessary electrode portion is subject to wet etching using a commercially available Au etchant and Cr etchant in that order, and then the resist is stripped so as to form the pattern wiring portions 6 and the comb shaped electrodes 4 as desired, as shown in FIGS. 2 and 3(c).

Further, a polyimide varnish is applied thereon by a printing method and cured for 30 minutes at 250° C. so as to form the polyimide protection film 8 having a thickness of 20 μm as shown in FIG. 3(d), to thereby produce the sensor portion "S".

Next, the pair of lead frames 7 is welded to the pair of the pad electrodes 5 of the sensor portion "S" on its base-end side, as shown in FIG. 4. At this time, the pair of lead frames 7 is arranged so as to surround the thermistor forming region 2a on its front-end side.

Furthermore, the pair of back-surface-side frames 9 is adhered to the back-surface side of the insulating film 2 with an adhesive or the like so as to be opposed to the pair of lead frames 7, as shown in FIG. 5. At this time, the pair of back-surface-side frames 9 is also arranged so as to surround the thermistor forming region 2a on its front-end side as in the front-end side of the pair of lead frames 7.

Then, as shown in FIG. 6, the protection film 10 of a polyimide film is adhered to the pair of back-surface-side frames 9 with an adhesive or the like so as to cover the upper opening between the pair of back-surface-side frames 9, to thereby produce the non-contact temperature sensor 1.

When a plurality of sensor portions "S" is simultaneously produced, a plurality of thin film thermistor portions 3, a plurality of comb shaped electrodes 4, a plurality of pattern wiring portions 6, a plurality of pad electrodes 5, and a plurality of protection films 10 are formed on a large-format sheet of the insulating film 2 as described above, and then the resulting large-format sheet is cut into a plurality of segments so as to obtain a plurality of sensor portions "S".

Thus, in the non-contact temperature sensor 1 according to the present embodiment, since the front-end side of the pair of lead frames 7 is arranged so as to surround the circumference of the thermistor forming region 2a in a non-contact manner, the thin film thermistor portion 3 is mechanically protected by the surrounding lead frames 7, and since it is not in contact with the surrounding lead frames 7, heat does not easily escape to the lead frames 7, thereby resulting in a high detection precision. In addition, since radiant heat is received by the thin film thermistor portion 3 that has a small heat capacity compared with a chip-type thermistor element and the like, a high responsivity can be obtained. Additionally, since the thermistor forming region 2a protrudes in the air in a non-contact manner and does not extend to the lead frames 7, it can be set up in a small area, leading to reduction in size of the sensor. Furthermore, even if a jammed paper changes the distance between the roller and the sensor in the case of measuring the temperature of the roller in a copying machine or the like, the sensor can be restored to its original position due to the spring property (elasticity) of the lead frames 7 after removal of the paper. Accordingly, the sensor can be placed closer to the roller than where the roller is conventionally placed, and thus a high detection precision can be obtained.

In addition, since the non-contact temperature sensor of the present invention includes the pair of back-surface-side frames 9 arranged with the base-end side thereof being adhered to the back-surface side of the electrode forming region 2b on the insulating film 2 and the front-end side thereof being arranged so as to surround the circumference of the thermistor forming region 2a in a non-contact manner, the thermistor forming region 2a is mechanically protected not only by the front-surface-side lead frames 7 but also by the back-surface-side frames 9, and thus reinforced with a higher rigidity. Also, since the electrode forming region 2b can be supported between the lead frames 7 and the back-surface-side frames 9, the joint strength between the lead frames 7 and the pad electrodes 5 can be maintained, thereby improving the reliability.

Furthermore, since the non-contact temperature sensor of the present invention includes the insulating protection film 10 arranged so as to cover the back-surface side of the thermistor forming region 2a in a non-contact manner, the protection film 10 can shield radiant heat on the back-surface side, and thus the influence of outside air or the like and, except from an object to be measured, the heat interference can be suppressed.

Also, since the pattern wiring portions 6 are made of a thin film having a film thickness of 100 to 300 nm in this non-contact temperature sensor, the film can be thinner at nano-level compared with a metal foil having a thickness of about 100 μm that is used for wiring in a common printed circuit board or the like. As a result, heat conductance can be significantly reduced, and further a high responsivity can be obtained.

Also, since the wiring forming region 2c is formed with a narrower width than those of the thermistor forming region 2a and the electrode forming region 2b in this non-contact temperature sensor, heat does not easily escape through the wiring forming region 2c, thereby resulting in a higher responsivity.

In addition, since the thin film thermistor portion 3 consists of a metal nitride represented by the general formula: $Ti_xAl_yN_z$ (where $0.70 \leq y/(x+y) \leq 0.98$, $0.4 \leq z \leq 0.5$, and $x+y+z=1$), wherein the crystal structure thereof is a hexagonal crystal system and a wurtzite-type single phase, a good B constant and a high heat resistance can be obtained without firing.

Further, since this metal nitride material is a columnar crystal extending in a vertical direction with respect to the surface of the film, the crystallinity of the film is high. Consequently, a high heat resistance can be obtained.

Furthermore, since this metal nitride material is more strongly oriented along the c-axis than the a-axis in a vertical direction with respect to the surface of the film, in comparison to the case of a strong a-axis orientation, a high B constant can be obtained.

Thus, since the thin film thermistor portion 3 made of the above-described thermistor material layer is formed on the insulating film 2 in the non-contact temperature sensor 1 of the present embodiment, the insulating film 2 having a low heat resistance, such as a resin film, can be used because the thin film thermistor portion 3 is formed without firing and has a high B constant and a high heat resistance. Consequently, a thin and flexible thermistor sensor having a good thermistor characteristic can be obtained.

The technical scope of the present invention is not limited to the aforementioned embodiments and Examples, but the present invention may be modified in various ways without departing from the scope or teaching of the present invention.

For example, in the embodiment described above, although nothing is particularly formed on the opposite side of the thin film thermistor portion (the back surface of the thermistor forming region) on the insulating film, an infrared reflection film may be formed of Au or the like on this portion. In this case, the infrared reflection film can reflect infrared radiation from the back-surface side so as to prevent the interference of radiant heat except from an object to be measured.

Also, in the embodiment described above, although the back-surface frame and the protection film are formed and adhered to the back surface of the insulating film as separate bodies, these may be integrated into a case-shaped body using a resin or the like and then adhered thereto.

REFERENCE NUMERALS

1: non-contact temperature sensor, 2: insulating film, 2a: thermistor forming region, 2b: electrode forming region, 2c: wiring forming region, 3: thin film thermistor portion, 4: comb shaped electrode, 4a: comb portion, 5: pad electrode, 6: pattern wiring portion, 7: lead frame, 8: protection film, 9: back-surface-side frame, 10: protection film, S: sensor portion

What is claimed is:
1. A non-contact temperature sensor comprising:
an insulating film;
a thin film thermistor portion made of a thermistor material that is patterned on a front-surface of the insulating film;
a pair of comb shaped electrodes that is patterned so as to be opposed to each other and to have a plurality of comb portions at least either on the upper or lower surface of the thin film thermistor portion;
a pair of pad electrodes that is patterned on a base-end side of the front-surface of the insulating film;
a pair of pattern wiring portions that is patterned on the front-surface of the insulating film with one end thereof being connected to the pair of comb shaped electrodes and the other end thereof being connected to the pair of pad electrodes; and
a pair of lead frames of which a base-end side is adhered to the pair of pad electrodes on the front-surface of the insulating film,
wherein the thin film thermistor portion is formed in a thermistor forming region arranged on a front-end side of the insulating film,
the pad electrodes are formed in an electrode forming region arranged on a base-end side of the insulating film,
the pair of lead frames extends along a direction from the base-end side of the insulating film to the front-end side of the insulating film, and a front-end side of the pair of lead frames extends beyond a front-end of the thermistor forming region in a non-contact manner, and
the thermistor forming region protrudes to a region between the pair of lead frames without contacting with the pair of lead frames.

2. The non-contact temperature sensor according to claim 1, comprising a pair of back-surface frames arranged with a base-end side thereof being adhered to a back-surface of the electrode forming region on the insulating film and a front-end side thereof being arranged so as to extend beyond a front-end of the thermistor forming region in a non-contact manner.

3. The non-contact temperature sensor according to claim 2, comprising
an insulating protection film arranged so as to cover a back-surface of the thermistor forming region in a non-contact manner.

4. The non-contact temperature sensor according to claim 1,
wherein the pattern wiring portions are made of a thin film having a film thickness of 100 to 300 nm.

5. The non-contact temperature sensor according to claim 1,
wherein the insulating film has a wiring forming region, in which the pattern wiring portions are arranged, between the thermistor forming region and the electrode forming region, and the wiring forming region is formed with a narrower width than those of the thermistor forming region and the electrode forming region.

* * * * *